United States Patent
Noguchi et al.

(10) Patent No.: US 6,797,373 B2
(45) Date of Patent: Sep. 28, 2004

(54) MAGNETIC RECORDING MEDIUM

(75) Inventors: Hitoshi Noguchi, Kanagawa (JP);
Nobuo Yamazaki, Kanagawa (JP);
Shinji Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 108 days.

(21) Appl. No.: 10/187,829

(22) Filed: Jul. 5, 2002

(65) Prior Publication Data

US 2003/0108772 A1 Jun. 12, 2003

(30) Foreign Application Priority Data

Jul. 5, 2001  (JP) ........................................ 2001-205290

(51) Int. Cl.$^7$ ............................ G11B 5/68; G11B 5/708; G11B 5/714
(52) U.S. Cl. ...................... 428/323; 428/328; 428/332; 428/336; 428/694 B; 428/694 BR
(58) Field of Search ................................ 428/323, 328, 428/332, 336, 649 B, 694 BR

(56) References Cited

U.S. PATENT DOCUMENTS 4,619,861 A * 10/1986 Nakayama et al. ......... 428/220
5,258,223 A * 11/1993 Inaba et al. ................. 428/323
5,478,626 A * 12/1995 Mori et al. .................. 428/141

* cited by examiner

Primary Examiner—Paul Thibodeau
Assistant Examiner—Nikolas J. Uhlir
(74) Attorney, Agent, or Firm—Sughrue Mion, PLLC

(57) ABSTRACT

Provided is a magnetic recording medium ensuring an adequate S/N even in high density magnetic recording, and tending not to electrostatically damage MR heads during recording and reproduction employing MR heads. A magnetic recording medium comprising a nonmagnetic layer comprising a nonmagnetic powder and a binder and a magnetic layer comprising a ferromagnetic metal powder or a ferromagnetic hexagonal ferrite powder and a binder in this order on at least one side of a nonmagnetic support, wherein said nonmagnetic layer comprises 10 to 50 mass parts of carbon black with a mean particle diameter of 10 to 30 nm per 100 mass parts of said nonmagnetic powder, said magnetic layer has a thickness equal to or less than 0.2 μm, the standard deviation b of the average intensity a of elements due to said ferromagnetic powder as determined by electron-beam microanalysis is $0.03 \leq b/a \leq 0.4$, and said magnetic layer has a center surface average roughness Ra equal to or less than 5 nm and a ten-point average roughness Rz equal to or less than 50 nm.

20 Claims, No Drawings

MAGNETIC RECORDING MEDIUM

FIELD OF THE INVENTION

The present invention relates to a particulate magnetic recording medium. The present invention particularly relates to a magnetic recording medium suited to high-density recording comprising a thin magnetic layer and a nonmagnetic layer.

BACKGROUND OF THE INVENTION

In recent years, recording wavelengths have tended to shorten as recording densities have increased. The problems of self-magnetization loss during recording and thickness loss during reproduction where output drops due to thick magnetic layer have become significant. Thus, the magnetic layer has been reduced in thickness. However, when a magnetic layer of 2 μm or less is coated directly onto a support, the nonmagnetic support tends to affect the magnetic layer surface, and deterioration of electromagnetic characteristics and dropout tend to result.

Under such conditions, recording and reproduction systems in which the track width is further narrowed have been recently developed to further increase recording density. By contrast, reproduction systems employing high-sensitivity magnetoresistive heads (MR heads) have been proposed and implemented in hard disks and the like.

However, in existing magnetic recording media, a high level of noise is encountered even when the output is adequately high. When MR heads are employed, a good S/N is not necessarily achieved. Examples thereof are given below.

For example, Japanese Unexamined Patent Publication (KOKAI) Heisei No. 3-214422 discloses a magnetic recording medium affording high reproduction output and low noise obtained by providing a dummy layer comprised principally of polymer resin and nonmagnetic particles on a nonmagnetic support, smoothing the surface of the dummy layer by calendering, and forming a magnetic layer over the dummy layer to achieve good magnetic layer surface properties. However, since the magnetic recording medium obtained by this method employs γ-iron oxides (γ-$Fe_2O_3$ and the like) as magnetic powder and exhibits a high magnetic layer surface roughness of 0.01 to 0.015 μm, it is impossible to ensure the S/N required for high density recording. Further, since this magnetic recording medium has a structure tending to collect static electricity, it presents a problem in that electrostatic damage tends to occur during recording and reproduction with MR heads.

Further, Japanese Unexamined Patent Publication (KOKAI) No. 2000-11354 discloses a magnetic recording medium in which a lower nonmagnetic layer is applied and dried, after which an upper magnetic layer is applied in a wet-on-dry coating method. However, this magnetic recording medium has a high lower layer surface roughness of 3.0 nm, precluding the obtaining of an adequate S/N particularly when employing MR heads. There is a further problem in that MR heads tend to be electrostatically damaged during recording and reproduction with this magnetic recording medium.

Accordingly, it is an object of the present invention is to provide a magnetic recording medium ensuring an adequate SIN even in high density magnetic recording, and tending not to electrostatically damage MR heads during recording and reproduction employing MR heads.

SUMMARY OF THE INVENTION

The present inventors conducted extensive research into improving the surface conditions on the magnetic layer in particulate magnetic recording media, resulting in the successful development of a magnetic recording medium capable of ensuring a high S/N and in which there is no electrostatic damage during recording and reproduction with MR heads; the present invention was devised on that basis.

That is, the present invention relates to a magnetic recording medium comprising a nonmagnetic layer comprising a nonmagnetic powder and a binder and a magnetic layer comprising a ferromagnetic metal powder or a ferromagnetic hexagonal ferrite powder and a binder in this order on at least one side of a nonmagnetic support, characterized in that said nonmagnetic layer comprises 10 to 50 mass parts of carbon black with a mean particle diameter of 10 to 30 nm per 100 mass parts of said nonmagnetic powder, said magnetic layer has a thickness equal to or less than 0.2 μm, the standard deviation b of the average intensity a of elements due to said ferromagnetic powder as determined by electron-beam microanalysis is $0.03 \leq b/a \leq 0.4$, and said magnetic layer has a center surface average roughness Ra equal to or less than 5 nm and a ten-point average roughness Rz equal to or less than 50 nm.

The preferred modes of the present invention are as follows:

(1) The magnetic recording medium in which the nonmagnetic layer is formed by coating and drying on the nonmagnetic support the nonmagnetic layer coating material comprising a nonmagnetic powder and a binder, after which the magnetic layer is formed;

(2) The magnetic recording medium in which the nonmagnetic layer is formed and then calendered; and (3) The magnetic recording medium for MR head reproduction employing MR heads during recording and reproduction.

The magnetic recording medium of the present invention is described in detail below.

The first characteristic of the magnetic recording medium of the present invention is that the nonmagnetic layer (also referred to as the "lower layer" hereinafter) comprises 10 to 50 mass parts of carbon black with a mean particle diameter of 10 to 30 nm per 100 mass parts of the nonmagnetic powder.

The mean particle diameter of the carbon black employed in the nonmagnetic layer of the present invention is 10 to 30 nm, preferably 15 to 25 nm, and more preferably 18 to 22 nm.

Further, the carbon black content in the lower layer is set to 10 to 50 mass parts, preferably 20 to 40 mass parts, and more preferably, 20 to 30 mass parts, per 100 mass parts of the nonmagnetic powder.

Restricting the mean particle diameter of the carbon black to within a range of 10 to 30 nm and the content of carbon black relative to the nonmagnetic powder to within a range of 10 to 50 mass parts reduces the surface electrical resistivity of the magnetic layer, results in a structure tending not to accumulate static electricity, and prevents electrostatic damage to MR heads.

Additionally, the incorporation of carbon black into the lower layer reduces light transmittance and achieves known effects such as the desired micro-Vickers hardness. Further, the incorporation of carbon black into the lower layer also achieves the effect of lubricant stockpiling.

The specific surface area of carbon black employed in the lower layer normally ranges from 100 to 500 m²/g, preferably from 150 to 400 m²/g. The DBP oil absorption capacity ranges from 20 to 400 ml/100 g, preferably from 30 to 400 ml/100 g. Carbon black preferably has a pH ranging from 2 to 10, a moisture content ranging from 0.1 to 10 percent, and a tap density ranging from 0.1 to 1 g/ml.

Specific examples of carbon black suitable for use in the lower layer are those described in WO98/35345. Carbon black can be used singly or in combination. The *Carbon Black Handbook* compiled by the Carbon Black Association may be consulted for types of carbon black suitable for use in the present invention.

The second characteristic of the magnetic recording medium of the present invention is a magnetic layer equal to or less than 0.2 μm in thickness and a standard deviation b of the average intensity a of elements due to the ferromagnetic powder as determined by electron-beam microanalysis of $0.03 \leq b/a \leq 0.4$.

The thickness of the magnetic layer is equal to or less than 0.2 μm, preferably 0.01 to 0.15 μm, and more preferably 0.01 to 0.1 μm. Restricting the thickness of the magnetic layer to equal to or less than 0.2 μm reduces self-magnetization loss and increases output, yields good overwrite characteristics (referred to hereinafter as "PW50"), and is advantageous to high-density recording. Further, when the thickness of the magnetic layer is equal to or less than 0.2 μm, surface electrical resistivity is high and MR heads are not damaged by static electricity.

The standard deviation b of the average intensity a of elements due to the ferromagnetic powder as determined by electron-beam microanalysis in the magnetic layer of the present invention is $0.03 \leq b/a \leq 0.4$.

An electron-beam microanalysis (EPMA) can evaluate the fill rate distribution of ferromagnetic powders in individual regions within the magnetic layer, that is, the fill property of the ferromagnetic powder using an average intensity a due to the ferromagnetic powder and the standard deviation b of the intensity. That is, the lower the value of b/a, the lower the nonuniformity of fill property due to aggregation of ferromagnetic powders and interface variation, interface flow, and the like between the nonmagnetic layer and the magnetic layer.

In the magnetic recording medium of the present invention, the size of the ferromagnetic powder or the like is controlled so that the value of b/a falls within a prescribed range when evaluated by EPMA. Accordingly, the method of evaluation by EPMA will be described below.

Using an EPMA-1600 made by Shimazu Corporation under conditions of an electron beam acceleration voltage of 15 kV, 30 nA, and a beam diameter of 1 μmφ, intensity mapping of target elements was conducted with at least 500×500 pixels over a range of 100×100 μm on the magnetic layer surface. A natural element such as Fe, Co, or Ba was selected from among the elements constituting the ferromagnetic powder. In the results of intensity mapping of elements obtained, intensities were divided into 256 steps, and the standard deviation b of the intensity distribution and the average intensity a are obtained employing an image analyzer KS400 manufactured Zeiss to calculate the value b/a.

The means of controlling value b/a is selected properly from among known means, and may be optimized when necessary. Examples of such controlling means are controlling the size and shape of the ferromagnetic powder, abrasives, carbon black and the like; selection of the binder; selection of various additives and the like such as dispersants, lubricants and surfactants; selection of the method of dispersing the magnetic coating liquid, the coating method, the orientation method and the like; and selection of calendering conditions. Of these, controlling by coating method is preferred. An example of the coating method is sequential multilayer coating.

In the present invention, value b/a is controlled to within $0.03 \leq b/a \leq 0.4$, preferably $0.03 \leq b/a \leq 0.3$, and more preferably $0.03 \leq b/a \leq 0.2$. When value b/a falls within $0.03 \leq b/a \leq 0.4$, there is no self-demagnetization loss and the fill property of the ferromagnetic powder is uniform, resulting in an improved S/N and making it possible to achieve a desired S/N ratio.

The third characteristic of the magnetic recording medium of the present invention is that the center surface average roughness Ra of the magnetic layer is equal to or less than 5 nm, and the ten-point average roughness Rz is equal to or less than 50 nm.

The center average surface roughness Ra (also referred to hereinafter as Ra) of the magnetic layer can be obtained by measuring the magnetic layer surface with a Model HD-2000 made by WYKO. The Ra is controlled to equal to or less than 5 nm, preferably 0.5 to 4 nm, and more preferably 0.5 to 3 nm. Restricting Ra to equal to or less than 5 nm permits a reduction in the spacing between the head and medium, an increased output, and a decrease in PW50.

Further, the ten-point average roughness Rz (also referred to hereinafter as Rz) of the magnetic layer can be obtained by the same measurement method as employed when measuring Ra. Rz is controlled to equal to or less than 50 nm, preferably 5 to 40 nm, and more preferably 5 to 30 nm. Controlling ten-point average roughness Rz to equal to or less than 50 nm permits a reduction in the spacing between the head and the medium, particularly a reduction in medium noise.

In addition to selecting carbon black with a mean particle diameter of 10 to 30 nm added to the nonmagnetic layer and setting the carbon black content in an amount of 10 to 50 mass parts per 100 mass parts of nonmagnetic powder, Ra and Rz may be controlled to within prescribed values by at least one of the following methods:

(1) Restricting the mean particle size of the nonmagnetic powder incorporated into the nonmagnetic layer to equal to or less than 0.2 μm, preferably 0.01 to 0.15 μm, and more preferably, 0.01 to 0.1 μm;

(2) After coating the nonmagnetic layer, the surface of the nonmagnetic layer is calendered to adjust the Ra of the nonmagnetic layer to equal to or less than 10 nm, preferably 1 to 5 nm, and more preferably 1 to 3 nm, and to adjust the Rz of the nonmagnetic layer to equal to or less than 100 nm, preferably 10 to 50 nm, and more preferably 10 to 30 nm;

(3) After coating the magnetic layer, calendering is conducted under conditions of a processing temperature equal to or greater than 70° C., preferably equal to or greater than 80° C., and a processing linear pressure equal to or greater than 196 kN/m (200 kg/cm), preferably equal to or greater than 294 kN/m (300 kg/cm); and (4) Increasing the dispersion time of the magnetic coating material as needed.

The individual layers of the magnetic layer, nonmagnetic layer, nonmagnetic support, and the like of the magnetic recording medium of the present invention will be described in detail below.

[Magnetic Layer]

The magnetic recording medium of the present invention has a magnetic layer (also referred to simply as an "upper layer" hereinafter) on at least one side of a nonmagnetic support. Accordingly, the upper layer may be provided on just one surface, or on both surfaces, of the nonmagnetic support. An upper layer formed on just one side may be comprised of a single layer or of multiple layers each having a different composition. Further, the magnetic recording medium of the present invention has a lower layer (nonmagnetic layer) that is essentially nonmagnetic between the nonmagnetic support and the upper layer.

The upper layer can be formed after drying of the lower layer in a wet-on-dry (W/D) coating method, or simultaneously with or sequentially following coating of the lower layer while the lower layer is still wet in a wet-on-wet (W/W) coating method. From the perspective of reducing noise caused by the thickness distribution of the magnetic layer, the W/D method in which coating is done after drying is preferred. In the W/D, a surface treatment step in which the surface of the lower layer is calendered following formation of the lower layer can be effectively employed to improve the surface roughness of the upper layer (magnetic layer), even when it is a thin layer. The ferromagnetic powder employed in the magnetic layer is preferably a ferromagnetic metal powder or hexagonal ferrite powder.

<Ferromagnetic Metal Powder>

A ferromagnetic metal powder comprising α-Fe as a main component is preferable as a ferromagnetic metal powder. In addition to prescribed atoms, the following atoms can be contained in the ferromagnetic metal powder: Al, Si, Ca, Mg, Ti, Cr, Cu, Y, Sn, Sb, Ba, W, La, Ce, Pr, Nd, P, Co, Mn, Zn, Ni, Sr, B and the like. Particularly, the incorporation of at least one of the following in addition to α-Fe is desirable: Al, Ca, Mg, Y, Ba, La, Nd, Sm, Co and Ni. Alloying of Co with Fe is particularly desirable because saturation magnetization increases and demagnetization improves. The Co content relative to Fe is preferably 1 to 40 atomic percent, more preferably 15 to 35 atomic percent, and still more preferably, 20 to 35 atomic percent.

The content of rare earth elements such as Y is preferably 1.5 to 12 atomic percent, more preferably 3 to 10 atomic percent, and still more preferably 4 to 9 atomic percent. The content of Al is preferably 1.5 to 12 atomic percent, more preferably 3 to 10 atomic percent, and still more preferably 4 to 9 atomic percent. Al and the rare earth elements, including Y, function as antisintering agents, and produce better antisintering effects when employed in combination. These ferromagnetic powders may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014.

The ferromagnetic metal powder may contain a small quantity of hydroxide or oxide. Ferromagnetic metal powders obtained by known manufacturing methods may be employed. The following methods are examples: methods of obtaining Fe or Fe—Co particles by reducing with a reducing gas such as hydrogen an iron oxide or hydrous iron oxide that has been treated to prevent sintering; methods of reduction with a reducing gas such as hydrogen and compound organic acid salts (chiefly oxalates); methods of thermally decomposing metallic carbonyl compounds; methods of reduction by adding a reducing agent such as sodium boron hydride, hypophosphite, or hydrazine to an aqueous solution of a ferromagnetic metal; and methods of vaporizing a metal in a low-pressure inert gas to obtain powder. The ferromagnetic metal powders thus obtained are subjected to a known slow oxidation treatment. Methods of forming a surface oxide film by reducing a hydrous iron oxide or iron oxide with a reducing gas such as hydrogen and controlling the pressure, temperature and duration of the hydrogen-containing gas and inert gas are preferred due to a low level of demagnetization.

The specific surface area by BET method ($S_{BET}$) of the ferromagnetic metal powder in the magnetic layer of the present invention ranges from 40 to 80 $m^2/g$, preferably from 45 to 70 $m^2/g$. The specific surface area ($S_{BET}$) ranging from 40 to 80 $m^2/g$ is preferable because noise can be suppressed and a smooth surface can be obtained. The crystallite size of the ferromagnetic metal powder in the magnetic layer of the present invention ranges from 80 to 180 Å, preferably from 100 to 170 Å, further preferably from 110 to 165 Å. The mean major axis length of the ferromagnetic metal powder ranges from 0.02 to 0.25 μm, preferably from 0.03 to 0.15 μm, further preferably from 0.03 to 0.12 μm.

The average acicular ratio (average of (major axis length/minor axis length)) of the ferromagnetic metal powder preferably ranges from 3 to 15, further preferably from 3 to 10. The saturation magnetization σs of the ferromagnetic powder normally ranges from 90 to 170 $A \cdot m^2/kg$, preferably from 100 to 160 $A \cdot m^2/kg$, further preferably from 110 to 160 $A \cdot m^2/kg$. The coercive force (Hc) of the ferromagnetic metal powder preferably ranges from 135 to 279 kA/m, preferably from 143 to 239 kA/m.

The moisture content of the ferromagnetic metal powder desirably ranges from 0.1 to 2 mass percent; the moisture content of the ferromagnetic metal powder is desirably optimized by means of the type of binder. The pH of the ferromagnetic metal powder is desirably optimized in combination with the binder employed; the range is normally 6 to 12, preferably 7 to 11. The stearic acid (SA) adsorption capacity of the ferromagnetic metal powder (the scale of basic points on the surface) is usually 1 to 15 $\mu mol/m^2$, preferably from 2 to 10 $\mu mol/m^2$, and more preferably from 3 to 8 $\mu mol/m^2$. When employing a ferromagnetic metal powder with a high stearic acid adsorption capacity, surface modification with an organic compound adsorbing strongly onto the surface is desirable to create a magnetic recording medium. Soluble inorganic ions such as Na, Ca, Fe, Ni, Sr, $NH_4$, $SO_4$, Cl, $NO_2$, and $NO_3$ are sometimes contained in the ferromagnetic metal powder. It is desirable for these to be essentially absent. At a total ion content equal to or less than about 300 ppm, characteristics are unaffected. Further, the ferromagnetic metal powder employed in the present invention desirably has few pores. The content of pores is equal to or less than 20 volume percent, preferably equal to or less than 5 volume percent. So long as the above-stated particle size and magnetic characteristics are satisfied, the particles may be acicular, rice-particle shaped, or spindle-shaped. The switching field distribution (SFD) of the ferromagnetic powder itself is desirably low, and it is necessary to decrease the coercive force (Hc) distribution of the ferromagnetic metal powder. When the tape SFD is low, magnetic reversal is sharp and the peak shift is low, which is suitable for high-density digital magnetic recording. A low coercive force (Hc) distribution is achieved, for example, by improving the goethite particle size distribution in the ferromagnetic metal powder; by employing monodispersed α-$Fe_2O_3$; by preventing sintering between particles.

<Hexagonal Ferrite Powder>

Examples of hexagonal ferrite contained in the magnetic layer of the present invention are various substitution products of barium ferrite, strontium ferrite, lead ferrite, and calcium ferrite, and Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

The mean plate diameter of the hexagonal ferrite powder employed in the present invention varies with the recording density, but is normally 10 to 50 nm, preferably 10 to 40 nm, and still more preferably 10 to 35 nm. Here, the term "plate diameter" means the maximum diameter of the hexagon on the bottom surface of the hexagonal column of hexagonal ferrite magnetic powder, and the term "mean plate diameter" means the arithmetic average thereof. In particular, when reproducing with a magnetoresistive head to increase track density, noise must be kept low, and a plate diameter equal to or less than 35 nm is desirable. However, high-density magnetic recording is suitably performed within a range of 10 to 50 nm because stable magnetization unaffected by thermal fluctuation can be anticipated and noise can be controlled. A plate ratio (plate diameter/plate thickness) of 1 to 15 is desirable and 1 to 7 is preferred. When the plate ratio is equal to or higher than 1, adequate orientation can be achieved while maintaining a high fill property in the magnetic layer. A plate ratio equal to or less than 15 tends to prevent influences by stacking of particles and prevents high noise levels.

The specific surface area by BET method within the above-mentioned particle size ranges from 30 to 200 m$^2$/g. The specific surface area almost corresponds to an arithmetic value from the particle plate diameter and the plate thickness. Narrow distributions of particle plate diameter and thickness are normally preferred. Although difficult to render in number form, 500 particles can be randomly measured in a TEM photograph of particles to make a comparison. This distribution is often not a normal distribution. However, when expressed as the standard deviation to the average size, $\sigma$/average size=0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution are known.

The coercive force (Hc) measured in the magnetic material can be made about 39.8 to 398 kA/m (500 to 5,000 Oe). The higher the coercive force (Hc), the greater the advantages for high-density recording, but this is limited by the capacity of the recording head. The coercive force (Hc) can be controlled by the particle size (plate diameter and plate thickness), the type and quantity of elements incorporated, the substitution sites of the elements, particle production reaction conditions, and the like.

The saturation magnetization ($\sigma$s) is 30 to 80 A·m$^2$/kg, and it tends to decrease as particles being smaller. Manufacturing methods include reducing the crystallization temperature or heat processing temperature and/or duration, increasing the quantity of compounds added, and increasing the level of surface treatment. It is also possible to employ W-type hexagonal ferrite. When dispersing the magnetic material, the particle surface of the magnetic material is also treated with a dispersion medium or substance conforming to the polymer.

Inorganic and organic compounds are employed as a surface treatment agent. Examples of the principal compounds are oxides and hydroxides of Si, Al, P and the like; various silane coupling agents; and various titanium coupling agents. The quantity added ranges from 0.1 to 10 percent relative to the magnetic material. The pH of the magnetic material is also important to dispersion. A pH of 4 to 12 is usually optimum for the dispersion medium and polymer. From the perspective of the chemical stability and storage properties of the medium, about 6 to 11 is selected. Moisture contained in the magnetic material also affects dispersion. There is an optimum level for the dispersion medium and polymer, usually selected from 0.01 to 2.0 percent.

Methods of manufacturing hexagonal ferrite include (1) the glass crystallization method in which a metal oxide substituted with barium oxide, iron oxide, and iron, and a glass-forming substance in the form of boron oxide or the like are mixed in proportions designed to yield a desired ferrite composition, melted, and quenched to obtain an amorphous product, subjected to a heat treatment again, washed, and pulverized to obtain barium ferrite crystal powder; (2) the hydrothermal reaction method in which a barium ferrite composition metal salt solution is neutralized with an alkali, the by-products are removed, the solution is liquid-phase heated at equal to or higher than 100° C., and the solution is washed, dried, and pulverized to obtain barium ferrite crystal powder; and (3) the coprecipitation method in which a barium ferrite composition metal salt solution is neutralized with an alkali, the by-products are removed, and the solution is dried, processed at equal to or less than 1,100° C., and pulverized to obtain barium ferrite crystal powder. However, any methods may be employed in the present invention.

[Nonmagnetic Layer (Lower Layer)]

Details of the nonmagnetic layer (lower layer) will be described next. The nonmagnetic layer mainly comprising a nonmagnetic inorganic powder and a binder is preferred. The nonmagnetic inorganic powder employed in the nonmagnetic layer may be selected from inorganic compounds, examples of which are: metal oxides, metal carbonates, metal sulfates, metal nitrides, metal carbides, metal sulfides and the like. Examples of inorganic compounds are $\alpha$-alumina having an $\alpha$-conversion rate equal to or higher than 90 percent, $\beta$-alumina, $\gamma$-alumina, $\theta$-alumina, silicon carbide, chromium oxide, cerium oxide, $\alpha$-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and $\alpha$-iron oxide. The mean particle diameter of these nonmagnetic inorganic powders preferably ranges from 0.005 to 2 $\mu$m. Nonmagnetic inorganic powders of differing mean particle diameter may be combined as needed, or the particle diameter distribution of a single nonmagnetic inorganic powder may be broadened to achieve the same effect. What is preferred most is a mean particle diameter in the nonmagnetic inorganic powder ranging from 0.01 to 0.2 μm. Particularly when the nonmagnetic inorganic powder is a granular metal oxide, a mean particle diameter equal to or less than 0.8 μm is preferred, and when being an acicular metal oxide, a mean major axis length equal to or less than 0.3 μm is preferred and equal to or less than 0.2 μm is further preferred.

The tap density normally ranges from 0.05 to 2 g/ml, preferably from 0.2 to 1.5 g/ml. The moisture content of the nonmagnetic inorganic powder ranges from 0.1 to 5 mass percent, preferably from 0.2 to 3 mass percent, further preferably from 0.3 to 1.5 mass percent. The pH of the nonmagnetic inorganic powder normally ranges from 2 to 11, and the pH between 5.5 to 10 is particular preferred. The specific surface area of the nonmagnetic inorganic powder ranges from 1 to 100 m$^2$/g, preferably from 5 to 80 m$^2$/g, further preferably from 10 to 70 m$^2$/g. The crystallite size of the nonmagnetic inorganic powder preferably ranges from 0.004 to 1 μm, further preferably from 0.04 to 0.1 μm. The oil absorption capacity using dibutyl phthalate (DBP) normally ranges from 5 to 100 ml/100 g, preferably from 10 to 80 ml/g, further preferably from 20 to 60 ml/100 g. The specific gravity normally ranges from 1 to 12, preferably from 3 to 6. The shape may be any of acicular, spherical, polyhedral, or plate-shaped. The Mohs' hardness preferably ranges from 4 to 10. The stearic acid (SA) adsorption capacity of the nonmagnetic inorganic powders ranges from 1 to 20 μmol/m$^2$, preferably from 2 to 15 μmol/m$^2$, further preferably from 3 to 8 μmol/m$^2$. The pH between 3 to 6 is preferred.

The surface of these nonmagnetic inorganic powders is preferably treated with $Al_2O_3$, $SiO_2$, $TiO_2$, $ZrO_2$, $SnO_2$, $Sb_2O_3$, ZnO and $Y_2O_3$. Those of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. These may be employed singly or in combination. Depending on the objective, the surface-treatment coating layer may be a porous layer, with homogeneity and density being generally desirable.

Examples of specific examples of the nonmagnetic inorganic powder employed in the lower layer of the present invention and manufacturing method thereof are those described in WO98/35345.

Based on the objective, an organic powder may be added to the lower layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed.

As regards binders, lubricants, dispersants, and additives; solvents; dispersion methods and the like of the lower layer or the back layer described below, those of magnetic layers can be applied. In particular, the techniques known with regard to magnetic layers may be applied to the quantity and types of binders, and the quantity and types of additives and dispersants added.

[Binder]

Conventionally known thermoplastic resins, thermosetting resins, reactive resins and mixtures thereof may be employed as binders used in the upper layer of the present invention.

The thermoplastic resins have a glass transition temperature of −100 to 150° C., a number average molecular weight of 1,000 to 200,000, preferably from 10,000 to 100,000, and have a degree of polymerization of about 50 to 1,000.

Examples are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melanine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in the *Handhook of Plastics* published by Asakura Shoten. It is also possible to employ known electron beam-cured resins in individual layers.

Examples thereof and methods of manufacturing the same are described in detail in Japanese Unexamined Patent Publication (KOKAI) Showa No. 62-256219. The above-listed resins may be used singly or in combination. Preferred resins are combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate.

Known structures of polyurethane resin can be employed, such as polyester polyurethane, polyether polyurethane, polyether polyester polyurethane, polycarbonate polyurethane, polyester polycarbonate polyurethane, and polycaprolactone polyurethane. To obtain better dispersibility and durability in all of the binders set forth above, it is desirable to introduce by copolymerization or addition reaction one or more polar groups selected from among —COOM, —SO$_3$M, —OSO$_3$M, —P=O(OM)$_2$, —O—P=O(OM)$_2$, (where M denotes a hydrogen atom or an alkali metal), NR$_2$, N$^+$R$_3$ (where R denotes a hydrocarbon group), epoxy groups, SH, and CN. The quantity of the polar group is $10^{-1}$ to $10^{-8}$ mol/g, preferably $10^{-2}$ to $10^{-6}$ mol/g.

In addition to these polar groups, each polyurethane molecule terminal desirably comprises at least one, with a total of two or more, OH groups. Since OH groups crosslink with the curing agent in the form of polyisocyanate to form a three-dimensional netlike structure, a large number are desirably contained within the molecule. OH groups present on molecule terminals react particularly well with the curing agent and are thus desirable. In the polyurethane molecule, there are desirably equal to or more than three terminal OH groups, with four or more being particularly desirable. When employing polyurethane in the present invention, the glass transition temperature is normally −50 to 150° C., preferably 0 to 100° C., and particular preferably 30 to 100° C. The elongation at break is 100 to 2,000 percent. The stress at break is normally 0.49 to 98 MPa (0.05 to 10 kg/mm$^2$). The yield point is desirably 0.49 to 98 MPa (0.05 to 10 kg/mm$^2$). Such physical properties yield a coated film with good mechanical characteristics.

Specific examples of the binders employed in the present invention are, for vinyl chloride copolymer, VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; for polyurethane resin, Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; polycarbonate polyurethane Daipheramine 4020, 5020, 5100, 5300, 9020, 9022, and 7020 from Dainichiseika Color & Chemicals Mfg. Co., Ltd.; polyurethane MX5004 from Mitsubishi Chemical Corporation; polyurethane Sanprene SP-150 from Sanyo Chemical Industries, Ltd.; and polyurethane Saran F310 and F210 from Asahi Chemical Industry Co., Ltd.

The quantity of binder employed in the lower layer or the magnetic layer ranges from 5 to 50 mass parts, preferably 10 to 30 mass parts, per 100 mass parts of nonmagnetic inorganic powder or magnetic powder. When employing vinyl chloride resin as binder, 5 to 30 mass parts are employed. When employing polyurethane resin, 2 to 20 mass parts are employed. And when employing polyisocyanate, 2 to 20 mass parts are employed. These are desirably employed in combination. For example, when the head corrodes due to trace quantities of escaping chlorine, polyurethane may be employed alone or together with isocyanate.

When the magnetic recording medium of the present invention comprises two or more layers, the quantity of binder; the proportion of vinyl chloride resin, polyurethane resin, polyisocyanate, or some other resin accounting for binder; the molecular weight of the various resins forming the magnetic layer; the quantity of polar groups; the physical characteristics of the above-described resins; and the like may be varied in each layer as necessary and optimized in each layer using known techniques relating to multiple magnetic layers. For example, when varying the quantity of binder in the various layers, scratching of the magnetic layer surface is effectively reduced by increasing the amount of binder in the magnetic layer, and head touch is improved by increasing the amount of binder in the nonmagnetic layer to impart flexibility.

Examples of polyisocyanates suitable for use in the present invention are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. They can be used singly or in combinations of two or more in all layers by exploiting differences in curing reactivity.

[Carbon Black]

Examples of types of carbon black that are suitable for use in the magnetic layer of the present invention are: furnace black for rubber, thermal for rubber, black for coloring and acetylene black. A specific surface area of 5 to 500 $m^2/g$, a DBP oil absorption capacity of 10 to 400 mL/100 g, a mean particle diameter of 5 to 300 nm, a pH of 2 to 10, a moisture content of 0.1 to 10 percent, and a tap density of 0.1 to 1 g/mL are desirable. Specific examples are those described in WO98/35345.

In the magnetic layer, carbon black works to prevent static, reduce the coefficient of friction, impart light-blocking properties, enhance film strength, and the like; the properties vary with the type of carbon black employed. Accordingly, if the present invention has a multilayer structure, the type, quantity, and combination thereof may be determined separately for each layer based on the objective and the various characteristics stated above, such as particle size, oil absorption capacity, electrical conductivity, and pH, and be optimized for each layer.

In addition, carbon black employed in the nonmagnetic layer is as described above.

[Abrasives]

Abrasives may be incorporated into the magnetic layer and the like of the magnetic recording medium of the present invention. Chiefly, known materials with a Mohs' hardness equal to or higher than 6 may be employed singly or in combination; examples are α-alumina having an α-conversion rate equal to or higher than 90 percent, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. Further, a composite comprising two or more of these abrasives (an abrasive obtained by surface-treating one abrasive with another) may also be used.

Although compounds and elements other than principal components are sometimes incorporated into the abrasive in the present invention, there is no change in effect so long as the principal components constitute at least 90 percent. The mean particle diameter of the abrasive is desirably 0.01 to 2 μm. To enhance electromagnetic characteristics (S/N), the particle size distribution is desirably narrow. To improve durability, an abrasive of different particle size may be combined as needed, or the particle diameter distribution of a single abrasive may be broadened to achieve the same effect.

A tap density of 0.3 to 2 g/mL, a moisture content of 0.1 to 5 percent, a pH of 2 to 11, and a specific surface area of 1 to 30 $m^2/g$ are desirable for the abrasive. The abrasive employed in the present invention may be acicular, spherical, or cubic in shape, but shapes that are partially angular have good abrasion properties and are thus preferred. Specific examples are those described in WO98/35345. In particular, employing diamond as described in the same is effective for improving running durability and electromagnetic characteristics. A particle diameter and quantity of abrasives added to the magnetic and nonmagnetic layers should be optimized, as a matter of course.

[Additives]

Substances having lubricating effects, antistatic effects, dispersion effects, plasticizing effects, or the like may be employed as additives in the magnetic layer and nonmagnetic layer of the present invention. They may be combined to achieve overall improvement in performance. Lubricants exerting strong effects on adhesion due to friction between the surfaces of substances may be employed as the above-described substances having lubricating effects. There are two types of lubricants. Although lubricants employed in the magnetic recording medium cannot be determined completely as fluid lubricity or boundary lubricity, they are classified into those exhibiting fluid lubricity such as higher fatty acid esters, liquid paraffin, silicon derivatives, and those exhibiting boundary lubricity such as long-chain fatty acids, fluorosurfactants, and fluorine-containing polymers according to the general concept. In particulate media, lubricants are present in binder in dissolved form or partly adhered to the surface of ferromagnetic powder, with the lubricant migrating to the surface of the magnetic layer. The speed of this migration is determined by the presence or absence of compatibility between binder and lubricant. When the binder and lubricant are highly compatible, the migration speed is low, and when compatibility is low, the migration speed accelerates. One method of examining the presence or absence of compatibility is to compare the dissolution parameters of the two. Nonpolar lubricants are effective for fluid lubricity and polar lubricants are effective for boundary lubricity.

In the present invention, it is preferable that higher fatty acid esters exhibiting fluid lubricity and long-chain fatty acids exhibiting boundary lubricity which have difference characteristics are combined, and it is further preferable that at least three of them are combined. Solid lubricants can be used together with them.

Examples of solid lubricants are molybdenum disulfide, tungsten graphite disulfide, boron nitride, and graphite fluoride. Examples of long-chain fatty acids exhibiting boundary lubricity are monobasic fatty acids having 10 to 24 carbon atoms (which may contain an unsaturated bond or may be branched) and metal (e.g., Li, Na, K, and Cu) salts thereof. Examples of fluorosurfactants and fluorine-containing polymers are fluorine-containing silicones, fluorine-containing alcohols, fluorine-containing esters, fluorine-containing alkylsulfuric esters, and alkali metal salts thereof. Examples of higher fatty acid esters exhibiting fluid lubricity are monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); and fatty acid esters of monoalkyl ethers of alkylene oxide polymers. Examples of fluid paraffin and silicon derivatives are dialkyl polysiloxane (the alkyls having 1 to 5 carbon atoms), dialkoxy polysiloxane (the alkoxy groups having 1 to 4 carbon atoms), monoalkyl monoalkoxy polysiloxane (the alkyls having 1 to 5 carbon atoms and the alkoxy groups having 1 to 4 carbon atoms), phenyl polysiloxane, fluoroalkyl polysiloxane (the alkyl having 1 to 5 carbon atoms), other silicone oils, polar group-comprising silicone, fatty acid-modified silicone, fluorine-containing silicone, and the like.

Examples of other lubricants are alcohols such as monohydric, dihydric, trihydric, tetrahydric, pentahydric, and hexahydric alcohols (which may contain an unsaturated bond or may be branched) having 12 to 22 carbon atoms, alkoxy alcohols having 12 to 22 carbon atoms (which may contain an unsaturated bond or may be branched), and fluorine-comprising alcohols; polyolefins such as polyethylene wax and polypropylene; polyglycols such as ethylene glycol and polyethylene oxide wax; alkyl phosphoric esters and alkali metal salts thereof; alkyl sulfuric esters and alkali metal salts thereof; polyphenylether; fatty acid amides with 8 to 22 carbon atoms; and fatty acid amines with 8 to 22 carbon atoms.

Examples of substances exhibiting antistatic effects, dispersion effects, and plasticizing effects are phenylphosphorous acids such as the "PPA" manufactured by Nissan Kagaku (K.K.); α-napthyl phosphates, phenyl phosphates, diphenyl phosphates, p-ethyl benzene phosphonates, phenyl phosphinates, aminoquinones, various silane coupling agents, titanium coupling agents, fluoroalkyl sulfuric esters, and alkali metal salts thereof.

The lubricants of particular preference in the present invention are fatty acids and fatty acid esters, specific examples being the compounds described in WO98/35345. Other lubricants and additives may be combined therewith for use.

It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in "A Guide to Surfactants" (published by Sangyo Tosho K. K.). These lubricants, antistatic agents and the like need not be 100 percent pure and may contain impurities, such as isomers, unreacted materials, by-products, decomposition products and oxides in addition to the main components. These impurities preferably comprise equal to or less than 30 weight percent, and more preferably equal to or less than 10 percent.

The fatty acid ester of preference for use in the present invention is a combination of the monoesters and diesters described in WO98/35345.

In the magnetic recording medium of the present invention, in particular, in the disk-shaped magnetic recording medium, the C/Fe peak ratio by Auger electron spectroscopy of the magnetic layer surface is preferably 5 to 100, more preferably 5 to 80. The measurement conditions for Auger electron spectroscopy are as follows:

| Device | Model PHI-660 made by Φ Corporation |
|---|---|
| Measurement conditions | Primary electron beam acceleration voltage 3 KV |
| Sample current | 130 nA |
| Magnification | 250-fold |
| Angle of incline | 30° |

Under the above-listed conditions, a kinetic energy range of 130 to 730 eV was integrated three times, the intensities of the carbon KLL peak and iron LMM peak were obtained as differentials, and the C/Fe ratio was calculated.

Further, the quantity of lubricants incorporated into each of the upper and lower layers of the magnetic recording medium of the present invention is desirably 5 to 30 mass parts per 100 mass parts of the ferromagnetic powder or nonmagnetic inorganic powder, respectively.

The lubricants and surfactants employed in the present invention each have different physical effects. The type, quantity, and combination ratio of lubricants producing synergistic effects should be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. Generally, a total quantity of lubricant ranging from 0.1 to 50 mass parts, preferably from 2 to 25 mass parts per 100 mass parts of the magnetic powder or nonmagnetic powder is selected.

All or some of the additives used in the present invention may be added at any stage in the process of manufacturing the magnetic and nonmagnetic coating liquids. For example, they may be mixed with the magnetic material before a kneading step; added during a step of kneading the magnetic material, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

[Support]

The support employed in the magnetic recording medium of the present invention is desirably a nonmagnetic flexible support. It is preferable that the thermal shrinkage rate at 100° C. at 30 minutes in all in-plane directions of the support is equal to or less than 0.5 percent, and at 80° C. at 30 minutes, preferably equal to or less than 0.5 percent, and more preferably equal to or less than 0.2 percent. Further, the thermal shrinkage rates of the support at 100° C. at 30 min and at 80° C. at 30 min are desirably equal to within a 10 percent difference in all in-plane directions of the support. The support is desirably nonmagnetic. Examples of such supports that are suitable for use are polyethylene terephthalate, polyethylene naphthalate and other polyesters, polyolefins, cellulose triacetate, polycarbonate, aromatic and aliphatic polyamides, polyimides, polyamidoimides, polysulfines, polyaramides, polybenzoxazoles, and other known films. The use of high-strength supports such as polyethylene naphthalate and polyamide is desirable. Further, as necessary, laminate-type supports as disclosed in Japanese Unexamined Patent Publication (KOKAI) Heisei No. 3-224127 may be employed to vary the surface roughness of the magnetic surface and base surface. These supports may be subjected beforehand to corona discharge treatment, plasma treatment, adhesion enhancing treatment, heat treatment, dust removal, and the like. Aluminum and glass substrates may also be suitably employed as supports in the present invention.

To achieve the object of the present invention, a support with a center surface average surface roughness Ra as measured by a Model HD-2000 made by WYKO Co. equal to or less than 4.0 nm, preferably equal to or less than 2.0 nm, is desirably employed. Not only a low center surface average surface roughness, but also the absence of coarse protrusions equal to or greater than 0.5 μm is also desirable. The roughness contour of the surface may be freely controlled when necessary through the size and quantity of filler added to the support. Examples of such fillers are oxides and carbonates of Ca, Si, Ti, and the like and organic powders such as acrylics. The maximum height Rmax of the support is desirably equal to or less than 1 μm, the ten-point average roughness Rz is desirably equal to or less than 0.5 μm, the center surface peak height Rp is desirably equal to or less than 0.5 μm, the center surface valley depth RV is desirably equal to or less than 0.5 μm, the center surface area ratio Sr is desirably equal to or higher than 10 percent and equal to or less than 90 percent, and the average wavelength λa is desirably equal to or higher than 5 μm and equal to or less than 300 μm. To achieve desired electromagnetic characteristics and durability, the surface protrusion distribution of these supports may be freely controlled with filler. Supports having surface protrusions of 0.01 to 1 μm in size may be controlled to within a range of 0 to 2,000 protrusions per 0.1 $mm^2$.

The F-5 value of the support employed in the present invention is desirably 49 to 490 MPa (5 to 50 kg/$mm^2$). The thermal shrinkage rate of the support at 100° C. at 30 min is preferably equal to or less than 3 percent, more preferably equal to or less than 1.5 percent. The thermal shrinkage rate at 80° C. at 30 min is desirably equal to or less than 1 percent, more preferably equal to or less than 0.5 percent. The breaking strength is desirably 49 to 980 MPa (5 to 100 kg/$mm^2$). The modulus of elasticity is desirably 0.98 to 19.6 GPa (100 to 2,000 kg/$mm^2$). The temperature expansion coefficient is $10^{-4}$ to $10^{-8}$/° C., preferably $10^{-5}$ to $10^{-6}$/° C. The moisture expansion coefficient is equal to or less than $10^{-4}$/RH %, preferably equal to or less than $10^{-5}$/RH percent. These thermal characteristics, dimensional characteristics, and mechanical strength characteristics are desirably identical to within a 10 percent difference in all in-plane directions of the support.

[Backcoat Layer]

A backcoat layer may be provided in the magnetic recording medium of the present invention as set forth above. A backcoat layer may be provided even on magnetic disks. Stronger repeat running properties are generally demanded of magnetic tapes employed in computer data recording than in video tapes and audio tapes. To maintain such high running durability, carbon black and inorganic powder are desirably incorporated into the backcoat layer.

Two types of carbon black of different average particle size are desirably combined for use in the backcoat layer. In that case, microgranular carbon black with a mean particle diameter ranging from 10 to 20 nm and coarse granular carbon black with a mean particle diameter ranging from 230 to 300 nm are desirably combined for use. Generally, the addition of microgranular carbon black as mentioned above makes it possible to set the surface electrical resistivity of the backcoat layer and the light transmittance low. The light transmittance of the tape is employed as an actuating signal in many magnetic recording devices, and in such cases, the addition of microgranular carbon black is particularly effective. Microgranular carbon black generally has good liquid lubricant holding ability, and when used in combination with lubricants, contributes to reducing the coefficient of friction. Further, coarse granular carbon black with a mean particle diameter ranging from 230 to 300 nm functions as a solid lubricant, forming small protrusions on the surface of the backcoat layer, reducing the contact surface area, and contributing to a reduction in the coefficient of friction.

Specific examples of commercially available products of microgranular and coarse granular carbon black employed in the backcoat layer of the present invention are given in WO98/35345.

When two types of carbon black of different mean particle diameter are employed in the backcoat layer, the content ratio (mass ratio) of 10 to 20 nm microgranular carbon black and 230 to 300 nm coarse granular carbon black preferably ranges, former:latter, from 98:2 to 75:25, more preferably from 95:5 to 85:15.

The content of carbon black in the backcoat layer (when two types are being employed, the total of both) normally ranges from 30 to 80 mass parts, preferably from 45 to 65 mass parts, per 100 mass parts of binder.

Two inorganic powders of differing hardness are desirably employed in combination in the backcoat layer. Specifically, a soft inorganic powder with a Mohs' hardness ranging from 3 to 4.5 and a hard inorganic powder with a Mohs' hardness ranging from 5 to 9 are desirably employed. The addition of a soft inorganic powder with a Mohs' hardness ranging from 3 to 4.5 permits stabilization of the coefficient of friction with repeat running. Within this hardness range, the slide guide poles are not shaved down. The mean particle diameter of the inorganic powder desirably ranges from 30 to 50 nm.

Examples of soft inorganic powders with a Mohs' hardness ranging from 3 to 4.5 that are suitable for use are: calcium sulfate, calcium carbonate, calcium silicate, barium sulfate, magnesium carbonate, zinc carbonate, and zinc oxide. These may be employed singly or in combinations of two or more.

The content of soft inorganic powder in the backcoat layer desirably ranges from 10 to 140 mass parts, preferably from 35 to 100 mass parts, per 100 mass parts of carbon black.

The addition of hard inorganic powder with a Mohs' hardness ranging from 5 to 9 increases the strength of the backcoat layer and improves running durability. The use of such inorganic powders with carbon black and the above-described soft inorganic powders yields a strong backcoat layer where little deterioration occurs with repeat sliding. Further, the addition of this inorganic powder contributes to suitable abrasive ability and reduces adhesion of shavings to the tape guide poles and the like. In particular, the combined use of soft inorganic powder improves sliding characteristics on rough-surfaced guide poles and permits stabilization of the coefficient of friction of the backcoat layer.

The mean particle diameter of the hard inorganic powder desirably ranges from 80 to 250 nm, preferably from 100 to 210 nm.

Examples of hard inorganic powders with a Mohs' hardness ranging from 5 to 9 are α-iron oxide, α-alumina, and chromium oxide ($Cr_2O_3$). These powders may be used singly or in combination. The powders of preference are α-iron oxide and α-alumina. The content of hard inorganic powder normally ranges from 3 to 30 mass parts, preferably from 3 to 20 mass parts, per 100 mass parts of carbon black.

When employing both the above-described soft inorganic powder and hard inorganic powder in the backcoat layer, these powders are desirably selected so that the difference in hardness between the soft inorganic powder and hard inorganic powder is equal to or greater than 2 (more preferably equal to or greater than 2.5, and particularly preferably, equal to or greater than 3).

The backcoat layer desirably comprises the above-described two types of inorganic powder of differing in Mohs' hardness of specified mean particle diameter and the two types of carbon black of the above-described differing in mean particle diameter.

A lubricant may be incorporated into the backcoat layer. The lubricant may be suitably selected from among the lubricants given as examples above for use in the nonmagnetic or magnetic layer. The lubricant is normally added in a range of 1 to 5 mass parts per 100 mass parts of binder.

[Layer Structure]

The thickness structure of the magnetic recording medium of the present invention normally comprises a nonmagnetic support ranging from 2 to 100 μm, preferably from 2 to 80 μm, in thickness. In computer tapes, a nonmagnetic support ranging from 3.0 to 6.5 μm (preferably from 3.0 to 6.0 μm, more preferably from 4.0 to 5.5 μm) in thickness is normally employed.

In the magnetic recording medium of the present invention, an undercoating layer may be provided to improve adhesion between the support, preferably a nonmagnetic flexible support, and the nonmagnetic layer or magnetic layer. In such cases, the thickness of the undercoating layer desirably ranges from 0.01 to 0.5 μm, preferably from 0.02 to 0.5 μm.

In the magnetic recording medium of the present invention, a backcoat layer may be provided on the opposite side of the support from the magnetic layer to provide an antistatic or curl-correcting effect. The thickness of the backcoat layer normally ranges from 0.1 to 4 μm, preferably from 0.3 to 2.0 μm. Known undercoating layers and backcoat layers may be employed.

The thickness of the magnetic layer of the magnetic recording medium of the present invention is optimized based on the saturation magnetization level and head gap length of the head employed and the recorded signal band, and is equal to or less than 0.2 μm in the present invention. The thickness of the lower layer normally ranges from 0.2 to 5.0 μm, preferably from 0.3 to 3.0 μm, and more preferably from 1.0 to 2.5 μm.

The lower layer performs its function by being essentially nonmagnetic. Even when trace amounts of magnetic powder are contained as impurities or intentionally incorporated, it is considered to have the same configuration as in the present invention essentially so long as exhibiting the effect of the present invention.

Here, the term "essentially nonmagnetic layer" means that the residual magnetic flux density of the lower layer is equal to or less than 10 mT or the coercive force Hc is equal to or less than 7.96 kA/m (100 Oe), with preferably no residual magnetic flux density and coercive force being exhibited. When magnetic powder is comprised in the lower layer, it desirably accounts for less than one-half of the total inorganic powder in the lower layer. Instead of a nonmagnetic layer, a soft magnetic layer comprising soft magnetic powder and binder can be formed as the lower layer. The thickness of the soft magnetic layer is identical to that of the above-described lower layer.

In a magnetic recording medium having two magnetic layers, a nonmagnetic layer or soft magnetic layer can be provided or omitted. For example, the thickness of the magnetic layer furthest from the support can be made from 0.01 to 0.1 μm, preferably 0.01 to 0.05 μm, and the thickness of the magnetic layer closest to the support can be made from 0.05 to 0.15 μm. When there is only a magnetic layer, the thickness of the magnetic layers is equal to or less than 0.2 μm as mentioned above.

[Manufacturing Method]

The process for manufacturing the magnetic coating material of the magnetic recording medium according to the present invention comprises at least a kneading step, a dispersing step, and a mixing step to be carried out, if necessary, before and/or after the kneading and dispersing steps. Each of the individual steps may be divided into two or more stages. All of the starting materials employed in the present invention, including the magnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion.

To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the magnetic powder or nonmagnetic powder and all or part of the binder (preferably equal to or higher than 30 percent of the entire quantity of binder) are kneaded in a range of 15 to 500 mass parts per 100 mass parts of magnetic powder. Details of the kneading process are described in Japanese Unexamined Patent Publication (KOKAI) Heisei Nos. 1-106338 and 1-79274. Further, glass beads may be employed to disperse the magnetic coating material and nonmagnetic coating material, with a dispersing medium with a high specific gravity such as zirconia beads, titania beads, and steel beads being suitable for use. The particle diameter and fill ratio of these dispersing media are optimized for use. A known dispersing device may be employed.

When a multilayer-structured magnetic recording medium is coated in the present invention, wet on dry coating method in which the lower layer is coated and dried, after which the magnetic layer is applied thereon is suitable for use to reduce noises caused by a thickness distribution of the magnetic layer.

Methods such as the following are desirably employed when coating a multilayer-structured magnetic recording medium in the present invention;

(1) a method in which the lower layer is first applied with a coating device commonly employed to apply magnetic coating materials such as a gravure coating, roll coating, blade coating, or extrusion coating device, and the upper layer is applied while the nonmagnetic layer is still wet by means of a support pressure extrusion coating device such as is disclosed in Japanese Examined Patent Publication (KOKOKU) Heisei No.1-46186 and Japanese Unexamined Patent Publication (KOKAI) Showa No. 60-238179 and Japanese Unexamined Patent Publication (KOKAI) Heisei No. 2-265672;

(2) a method in which the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No.2-17971, and Japanese Unexamined Patent Publication (KOKAI) Heisei No.2-265672; and (3) a method in which the upper and lower layers are applied nearly simultaneously using an extrusion coating apparatus with a backup roller as disclosed in Japanese Unexamined Patent Publication (KOKAI) Heisei No.2-174965.

To avoid compromising the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No.3-8471.

For disks, although adequate isotropic orientation can sometimes be achieved where there is no orientation without using an orienting device, the use of a known random orienting device wherein cobalt magnets are alternately positioned at angles or an alternating current magnetic field is applied by a solenoid is desirable. Hexagonal ferrite is normally readily randomized in the three dimensions of the in-plane directions and the vertical direction, but in-plane two-dimensional randomization is also possible. Further, a known method such as magnets positioned with opposite poles facing can be used to impart isotropic magnetic characteristics in a circumferential direction by vertical orientation. Particularly in high-density recording, vertical orientation is desirable. Further, circumferential orientation achieved by spin coating may also be employed.

Magnetic tapes are longitudinally oriented with cobalt magnets or solenoids. The temperature and flow rate of the air used for drying and the coating rate are desirably controlled to control the drying position of the coating. A coating rate ranging from 20 to 1,000 m/min and drying air temperature equal to or greater than 60° C. are desirable. Suitable predrying can be conducted prior to entry into the magnet zone.

The calender rolls may be made of epoxy, polyimide, polyamide, polyimidoamide, or some other heat-resistance plastic roll or metal roll. When magnetic layers are provided on both surfaces, processing with metal rolls is particularly desirable. The processing temperature is desirably equal to or greater than 50° C., more preferably equal to or greater than 100° C. The linear pressure is desirably equal to or greater than 196 kN/m (200 kg/cm), more preferably equal to or greater than 294 kN/m (300 kg/cm).

[Physical Characteristics]

In magnetic disks, squareness normally ranges from 0.55 to 0.67, preferably from 0.58 to 0.64, in the case of two-dimensional randomization. For three-dimensional randomization, squareness is desirably from 0.45 to 0.55. For vertical orientation, squareness is normally equal to or greater than 0.6, preferably equal to or greater than 0.7, in the vertical direction. When reverse magnetic field correction has been conducted, squareness is usually equal to or greater than 0.7, preferably equal to or greater than 0.8. The orientation ratio of two-dimensional randomization and three-dimensional randomization is desirably equal to or greater than 0.8. For two-dimensional randomization, squareness in the vertical direction, Br in the vertical direction, and Hc in the vertical direction are desirably within 0.1 to 0.5 times those in the in-plane directions. For magnetic tapes, squareness is equal to or greater than 0.7, preferably equal to or greater than 0.8.

The coefficient of friction of the magnetic recording medium of the present invention relative to the head is normally equal to or less than 0.5, preferably equal to or less than 0.3, within a temperature range of −10 to 40° C. and a humidity range of 0 to 95 percent. The surface specific resistivity desirably ranges from $10^4$ to $10^{12}$ Ω/sq of the magnetic surface. The charge potential desirably ranges from −500 to +500 V. The modulus of elasticity at 0.5 percent elongation of the magnetic layer is desirably 980 to 19,600 MPa (100 to 2,000 kg/mm$^2$) in each of the in-plane directions. The breaking strength is desirably 98 to 686 MPa (10 to 70 kg/mm$^2$). The modulus of elasticity of the magnetic recording medium is desirably 980 to 14,700 MPa (100 to 1,500 kg/mm$^2$) in each of the in-plane directions. The residual elongation is desirably equal to or less than 0.5 percent. The thermal shrinkage rate at all temperatures equal to or lower than 100° C. is preferably equal to or less than 1 percent, more preferably equal to or less than 0.5 percent, and still more preferably, equal to or less than 0.1 percent. The glass transition temperature (i.e., the temperature at which the loss elastic modulus of dynamic viscoelasticity as measured at 110 Hz peaks) of the magnetic layer preferably ranges from 50° C. to 120° C., and that of the lower layer preferably ranges from 0 to 100° C. The loss elastic modulus preferably ranges from $1\times10^5$ to $8\times10^8$ Pa and the loss tangent is preferably equal to or less than 0.2. Adhesion failure tends to occur when the loss tangent becomes excessively large. These thermal characteristics and mechanical characteristics vary within 10 percent in each of the in-plane directions of the medium and are desirably almost equal. The residual solvent in the magnetic layer is preferably equal to or less than 100 mg/m$^2$ and more preferably equal to or less than 10 mg/m$^2$. The void ratio in both the lower and upper coated layers is preferably equal to or less than 30 volume percent, more preferably equal to or less than 20 volume percent. Although a low void percentage is preferable for attaining high output, there are some cases in which it is better to maintain a certain level depending on the purpose. For example, in disk media where repeat applications are important, higher void ratios often result in better running durability.

The center surface average surface roughness Ra and the ten-point average roughness Rz in the magnetic layer of the present invention, as stated above, are equal to or less than 5 nm and equal to or less than 50 nm, respectively. The maximum height of the magnetic layer $R_{max}$ is desirably equal to or less than 0.5 μm, the center surface peak height Rp is desirably equal to or less than 0.3 μm, the center surface valley depth Rv is desirably equal to or less than 0.3 μm, the center surface surface area ratio Sr is desirably 20 to 80 percent, and the average wavelength λ a is desirably 5 to 300 μm. The surface protrusions on the magnetic layer may be set at will to within a range of 0 to 2,000 protrusions ranging in size from 0.01 to 1 μm. This is desirably used to optimize electromagnetic characteristics and the coefficient of friction. These can be readily controlled by controlling surface properties by means of the filler in the support, controlling the particle diameter and quantity of powder added to the magnetic layer, and controlling the surface shape of the rolls used in calendering. Curling is desirably kept to within ±3 mm. It will be readily understood that these physical characteristics may be different in the upper and lower layers of the magnetic recording medium of the present invention. For example, the modulus of elasticity of the upper layer may be raised to improve running durability at the same time as the modulus of elasticity of the lower layer is reduced to below that of the upper layer to improve the head contact of the magnetic recording medium.

[Embodiment]

Specific embodiments of the present invention are described below; however, the present invention should not be limited thereto. Unless specifically stated otherwise, "parts" refers to "mass parts".

| Magnetic coating liquid A | |
|---|---|
| Hexagonal barium ferrite | 100 parts |
| Surface treatment: 5 weight percent of Al$_2$O$_3$ and 2 weight percent of SiO$_2$ | |
| Coercive force (Hc): 199 kA/m (2500 Oe) | |
| Plate diameter: 30 nm | |
| Plate ratio: 3 | |
| Saturation magnetization (σs): 56 A · m$^2$/kg (56 eum/g) | |
| Vinyl chloride copolymer | 6 parts |
| MR110 (manufactured by Nippon Zeon Co., Ltd.) | |
| Polyurethane resin | 3 parts |
| UR8200 (manufactured by Toyobo Co., Ltd.) | |
| α-alumina | 4 parts |
| HIT60 (manufactured by Sumitomo Chemical Co., Ltd.) | |
| Diamond (mean particle diameter: 100 nm) | 2 parts |
| Carbon black | 1 part |

| Magnetic coating liquid A | |
|---|---|
| #50 (manufactured by Asahi Carbon Co., Ltd.) | |
| Isocetyl stearate | 5 parts |
| Stearic acid | 1 part |
| Oleic acid | 1 part |
| Methyl ethyl ketone | 80 parts |
| Cyclohexanone | 120 parts |

| Magnetic coating material B | |
|---|---|
| Ferromagnetic metal powder | 100 parts |
| Composition: 70 percent of Fe and 30 percent of Co | |
| Coercive force (Hc): 183 kA/m (2300 Oe) | |
| Major axis length: 0.045 μm | |
| Crystallite size: 115 Å | |
| Saturation magnetization (σs): 110 A · m$^2$/kg (110 emu/g) | |
| Sintering preventing agent: | |
| Al compound (14 percent of Al/Fe atomic ratio) | |
| Y compound (7 percent of Y/Fe atomic ratio) | |
| Vinyl chloride copolymer | 10 parts |
| MR110 (manufactured by Nippon Zeon Co., Ltd.) | |
| Polyurethane resin | 4 parts |
| UR8200 (manufactured by Toyobo Co., Ltd.) | |
| α-alumina | 4 parts |
| HIT60 (manufactured by Sumitomo Chemical Co., Ltd.) | |
| Diamond (mean particle diameter: 100 nm) | 2 parts |
| Carbon black | 1 part |
| #50 (manufactured by Asahi Carbon Co., Ltd.) | |
| Phenylphosphorous acid | 3 parts |
| n-butyl stearate | 1 part |
| Butoxyethyl stearate | 1 part |
| Isocetyl stearate | 2 parts |
| Stearic acid | 1 part |
| Oleic acid | 1 part |
| Methyl ethyl ketone | 140 parts |
| Cyclohexanone | 200 parts |

| Nonmagnetic coating material | |
|---|---|
| α-Fe$_2$O$_3$ Hematite | 100 parts |
| Major axis length: 0.07 μm | |
| Minor axis length: 0.014 μm | |
| Specific surface area by BET method: 55 m$^2$/g | |
| pH: 9 | |
| Surface treatment agent: Al$_2$O$_3$, 8 mass percent | |
| Carbon black (mean particle diameter: 20 nm) | 25 parts |
| Conductex SC-U (manufactured by Columbia Carbon Co., Ltd.) | |
| Vinyl chloride copolymer | 15 parts |
| MR104 (manufactured by Nippon Zeon Co., Ltd.) | |
| Polyurethane resin | 7 parts |
| UR5500 (manufactured by Toyobo Co., Ltd.) | |
| Phenylphosphorous acid | 4 parts |
| Isocetyl stearate | 6 parts |
| Oleic acid | 1.3 parts |
| Stearic acid | 1.3 parts |
| Methyl ethyl ketone/Cyclohexanone (solvent mixed at 8/2) | 250 parts |

(Embodiment 1)

Each component of above-listed magnetic coating material A and nonmagnetic coating material was kneaded in a kneader and dispersed using a sand mill. Polyisocyanate was added to the dispersion of magnetic liquid A and the dispersion of nonmagnetic coating material; 13 parts to the coating liquid of the nonmagnetic layer and four parts to the coating liquid of magnetic coating material A. To each, added were 30 parts of cyclohexanone and the mixtures were filtered with a filter having an average pore diameter of 1 μm to prepare coating liquids for the nonmagnetic layer and magnetic layer.

The nonmagnetic layer coating liquid was applied to and dried on a polyethylene terephthalate support having a center surface average surface roughness of 3 nm and a thickness of 62 μm in a quantity calculated to yield a thickness after drying of 1.5 μm. Following drying, the processing was conducted with a seven-stage calender at a temperature of 90° C. and a linear pressure of 294 kN/m (300 kg/cm). Subsequently, a coating was applied to and dried on the nonmagnetic layer to yield a magnetic layer of 0.1 μm in thickness. Following drying, processing was conducted with a seven-stage calender at a temperature of 90° C. and a linear pressure of 294 kN/m (300 kg/cm), the product was punched to 3.7 inches, and surface polishing was conducted.

(Embodiments 2–7)

With the exception that the carbon black added to the nonmagnetic coating material of Embodiment 1 was changed to those having the mean particle diameters and quantities added indicated in Table 1, the same process was conducted as in Embodiment 1.

(Embodiments 8–11)

With the exception that the linear pressure and temperature employed in calendering following coating and drying on the support of the coating liquid for the nonmagnetic layer of Embodiment 1 were changed to the conditions indicated in Table 1, the same process was conducted as in Embodiment 1.

(Embodiment 12)

With the exception that the magnetic layer thickness of Embodiment 1 was changed from 0.1 μm to 0.15 μm, the same process was conducted as in Embodiment 1.

(Embodiment 13)

With the exception that the magnetic layer thickness in Embodiment 1 was changed from 0.1 μm to 0.2 μm, the same process was conducted as in Embodiment 1.

(Embodiment 14)

With the exception that calendering was omitted following coating and drying of the nonmagnetic coating liquid on the support in Embodiment 1, the same process was conducted as in Embodiment 1.

(Embodiment 15)

With the exception that the magnetic coating material in Embodiment 1 was changed from A to B and the magnetic layer thickness was changed from 0.1 μm to 0.07 μm, the same process was conducted as in Embodiment 1.

(Embodiments 16–21)

With the exception that the mean particle diameter and quantity of the carbon black added to the nonmagnetic coating material in Embodiment 15 were changed as indicated in Table 1, the same process was conducted as in Embodiment 15.

(Embodiment 22)

With the exception that calendering was omitted following coating and drying of the nonmagnetic coating liquid on the support in Embodiment 15, the same process was conducted as in Embodiment 1.

COMPARATIVE EXAMPLE 1

A magnetic coating material and a nonmagnetic coating material were prepared by the same method as in Embodiment 1, the nonmagnetic layer coating liquid was applied in a quantity calculated to yield a thickness following drying of 1.5 μm, and immediately thereafter, the magnetic layer coating liquid was coated in a quantity calculated to yield a magnetic layer thickness of 0.1 μm, to a polyethylene terephthalate support having a center surface average surface roughness of 3 nm and a thickness of 62 μm in a simultaneous multilayer coating (wet-on-wet). While the two layers were still wet, random orientation was done. Following drying, calendering was done at a linear pressure of 294 kN/m (300 kg/cm) and a temperature of 90° C. with a seven-stage calender, and the product was punched to 3.7 inches, and surface-polished.

COMPARATIVE EXAMPLES 2–5

With the exception that the mean particle diameter and quantity of the carbon black added to the nonmagnetic coating material in Embodiment 1 were changed as indicated in Table 1, the same process was conducted as in Embodiment 1.

COMPARATIVE EXAMPLE 6

With the exception that the magnetic layer thickness of 0.1 μm employed in Embodiment 1 was changed to 0.25 μm, the same method was employed as in Embodiment 1.

COMPARATIVE EXAMPLE 7

With the exception that the magnetic coating material in Comparative Example 1 was changed from A to B and the thickness of the magnetic layer was changed from 0.1 μm to 0.07 μm, the same process was conducted as in Comparative Example 1.

COMPARATIVE EXAMPLES 8–11

With the exception that the mean particle diameter and quantity of the carbon black added to the nonmagnetic coating material in Embodiment 15 were changed as indicated in Table 1, the same process was conducted as in Embodiment 15.

[Measurement of Ra and Rz]

Measurement was conducted under the following conditions with a Model HD-2000 made by WYKO Co.:

Objective lens: ×50

Intermediate lens: ×0.5

Measurement range: 242 μm×184 μm

Following data incline correction and cylinder correction, the center surface average roughness (Ra) and ten-point average roughness (Rz) were measured.

[Measurement of b/a Value]

Using an EPMA-1600 made by Shimazu Corporation under conditions of an electron beam acceleration voltage of 15 kV, 30 nA, and a beam diameter of 1 μmφ, intensity mapping of target elements was conducted with at least 500×500 pixels over a range of 100×100 μm on the magnetic layer surface.

In the case of ferromagnetic metal powders, Co, Y, or the like may be selected as the element specific to the magnetic layer. In the present embodiments, Co was selected. In the case of hexagonal ferrite magnetic material, Ba was selected as the element specific to the magnetic layer.

The results of element intensity mapping obtained were divided into 256 steps, an image analyzer KS400 manufactured by ZEISS was used to obtain the standard deviation (b) and average value (a) of the intensity distribution, and b/a was calculated.

[Measurement of S/N]

In S/N measurement, a Model RWA1001 disk evaluating device made by GUZIK in U.S. and a spin stand LS-90 made by Kyodo Denshi System K.K. were employed using a metal in-gap head with a track width of 5 μm and a gap length of 0.2 µm. A linear recording density 100 KFCI signal was written at positions at a radius of 24.6 mm and reproduced with an MR head having a track width of 2.6 µm. The reproduction output (TAA) and noise level after DC erasure were measured and the SIN was calculated.

In Comparative Examples 4, 6 and 10, the MR heads were damaged by static electricity during measurement, precluding measurement.

[PW50 Measurement]

In PW50 measurement, a Model RWA1001 disk evaluating device made by GUZIK in U.S. and a spin stand LS-90 made by Kyodo Denshi System K.K. were employed using a metal in-gap head with a track width of 5 µm and a gap length of 0.2 µm. An isolated reverse waveform signal was written at positions at a radius of 24.6 mm and reproduced with an MR head with a track width of 2.6 µm and the PW50 was measured.

In Comparative Embodiments 4, 6 and 10, the MR heads were damaged by static electricity during measurement, precluding measurement.

TABLE 1

| | Magnetic coating material | Carbon black Mean particle diameter (nm) | Content (parts) | Magnetic layer thickness (µm) | Coating method | Calendering after coating lower layer |
|---|---|---|---|---|---|---|
| Embodiment 1 | A | 20 | 25 | 0.1 | wet on dry | Linear pressure 294 kN/m, temp. 90° C. |
| Embodiment 2 | A | 10 | 25 | 0.1 | wet on dry | Linear pressure 294 kN/m, temp. 90° C. |
| Embodiment 3 | A | 30 | 25 | 0.1 | wet on dry | Linear pressure 294 kN/m, temp. 90° C. |
| Embodiment 4 | A | 20 | 15 | 0.1 | wet on dry | Linear pressure 294 kN/m, temp. 90° C. |
| Embodiment 5 | A | 20 | 10 | 0.1 | wet on dry | Linear pressure 294 kN/m, temp. 90° C. |
| Embodiment 6 | A | 20 | 40 | 0.1 | wet on dry | Linear pressure 294 kN/m, temp. 90° C. |
| Embodiment 7 | A | 20 | 50 | 0.1 | wet on dry | Linear pressure 294 kN/m, temp. 90° C. |
| Embodiment 8 | A | 20 | 25 | 0.1 | wet on dry | Linear pressure 196 kN/m, temp. 90° C. |
| Embodiment 9 | A | 20 | 25 | 0.1 | wet on dry | Linear pressure 98 kN/m, temp. 90° C. |
| Embodiment 10 | A | 20 | 25 | 0.1 | wet on dry | Linear pressure 294 kN/m, temp. 70° C. |
| Embodiment 11 | A | 20 | 25 | 0.1 | wet on dry | Linear pressure 294 kN/m, temp. 50° C. |
| Embodiment 12 | A | 20 | 25 | 0.15 | wet on dry | Linear pressure 294 kN/m, temp. 90° C. |
| Embodiment 13 | A | 20 | 25 | 0.2 | wet on dry | Linear pressure 294 kN/m, temp. 90° C. |
| Embodiment 14 | A | 20 | 25 | 0.1 | wet on dry | None |
| Embodiment 15 | B | 20 | 25 | 0.07 | wet on dry | Linear pressure 294 kN/m, temp. 90° C. |
| Embodiment 16 | B | 10 | 25 | 0.07 | wet on dry | Linear pressure 294 kN/m, temp. 90° C. |
| Embodiment 17 | B | 30 | 25 | 0.07 | wet on dry | Linear pressure 294 kN/m, temp. 90° C. |
| Embodiment 18 | B | 20 | 15 | 0.07 | wet on dry | Linear pressure 294 kN/m, temp. 90° C. |
| Embodiment 19 | B | 20 | 10 | 0.07 | wet on dry | Linear pressure 294 kN/m, temp. 90° C. |
| Embodiment 20 | B | 20 | 40 | 0.07 | wet on dry | Linear pressure 294 kN/m, temp. 90° C. |
| Embodiment 21 | B | 20 | 50 | 0.07 | wet on dry | Linear pressure 294 kN/m, temp. 90° C. |
| Embodiment 22 | B | 20 | 25 | 0.07 | wet on dry | None |
| Comp. Ex. 1 | A | 20 | 25 | 0.1 | wet on wet | — |
| Comp. Ex. 2 | A | 5 | 25 | 0.1 | wet on dry | Linear pressure 294 kN/m, temp. 90° C. |
| Comp. Ex. 3 | A | 40 | 25 | 0.1 | wet on dry | Linear pressure 294 kN/m, temp. 90° C. |
| Comp. Ex. 4 | A | 20 | 5 | 0.1 | wet on dry | Linear pressure 294 kN/m, temp. 90° C. |
| Comp. Ex. 5 | A | 20 | 60 | 0.1 | wet on dry | Linear pressure 294 kN/m, temp. 90° C. |
| Comp. Ex. 6 | A | 20 | 25 | 0.25 | wet on dry | Linear pressure 300 kg/cm, temp. 90° C. |
| Comp. Ex. 7 | B | 20 | 25 | 0.07 | wet on wet | — |
| Comp. Ex. 8 | B | 5 | 25 | 0.07 | wet on dry | Linear pressure 294 kN/m, temp. 90° C. |
| Comp. Ex. 9 | B | 40 | 25 | 0.07 | wet on dry | Linear pressure 294 kN/m, temp. 90° C. |
| Comp. Ex. 10 | B | 20 | 5 | 0.07 | wet on dry | Linear pressure 294 kN/m, |

TABLE 1-continued

| | | | | | | temp. 90° C. |
|---|---|---|---|---|---|---|
| Comp. Ex. 11 | B | 20 | 60 | 0.07 | wet on dry | Linear pressure 294 kN/m, temp. 90° C. |

| | b/a value | Magnetic layer Ra (nm) | Magnetic layer Rz (nm) | S/N (dB) | PW50 (μm) | Electrostatic damage |
|---|---|---|---|---|---|---|
| Embodiment 1 | 0.12 | 2 | 25 | 28 | 0.25 | None |
| Embodiment 2 | 0.14 | 3 | 30 | 28 | 0.30 | None |
| Embodiment 3 | 0.12 | 2 | 25 | 28 | 0.25 | None |
| Embodiment 4 | 0.11 | 2 | 20 | 30 | 0.22 | None |
| Embodiment 5 | 0.1 | 2 | 20 | 29 | 0.22 | None |
| Embodiment 6 | 0.13 | 2.5 | 30 | 27 | 0.30 | None |
| Embodiment 7 | 0.22 | 4 | 40 | 26 | 0.35 | None |
| Embodiment 8 | 0.15 | 3 | 30 | 27 | 0.30 | None |
| Embodiment 9 | 0.2 | 3.5 | 35 | 26 | 0.32 | None |
| Embodiment 10 | 0.15 | 3 | 30 | 27 | 0.30 | None |
| Embodiment 11 | 0.2 | 3.5 | 35 | 26 | 0.32 | None |
| Embodiment 12 | 0.1 | 2 | 25 | 29 | 0.30 | None |
| Embodiment 13 | 0.08 | 2 | 25 | 30 | 0.40 | None |
| Embodiment 14 | 0.35 | 4 | 50 | 23 | 0.40 | None |
| Embodiment 15 | 0.15 | 3 | 30 | 28 | 0.25 | None |
| Embodiment 16 | 0.17 | 3.5 | 40 | 28 | 0.30 | None |
| Embodiment 17 | 0.15 | 3 | 30 | 28 | 0.25 | None |
| Embodiment 18 | 0.14 | 3 | 30 | 30 | 0.22 | None |
| Embodiment 19 | 0.13 | 3 | 30 | 29 | 0.22 | None |
| Embodiment 20 | 0.16 | 3.5 | 40 | 27 | 0.30 | None |
| Embodiment 21 | 0.25 | 4 | 50 | 26 | 0.35 | None |
| Embodiment 22 | 0.35 | 5 | 50 | 20 | 0.40 | None |
| Comp. Ex. 1 | 0.53 | 4 | 40 | 18 | 0.55 | None |
| Comp. Ex. 2 | 0.42 | 6 | 70 | 18 | 0.55 | None |
| Comp. Ex. 3 | 0.45 | 8 | 90 | 15 | 0.60 | None |
| Comp. Ex. 4 | 0.1 | 2 | 20 | — | — | Obserbed |
| Comp. Ex. 5 | 0.45 | 8 | 90 | 15 | 0.60 | None |
| Comp. Ex. 6 | 0.04 | 2 | 25 | — | — | Obserbed |
| Comp. Ex. 7 | 0.55 | 4.5 | 50 | 20 | 0.55 | None |
| Comp. Ex. 8 | 0.42 | 6.5 | 70 | 18 | 0.55 | None |
| Comp. Ex. 9 | 0.45 | 8 | 90 | 15 | 0.60 | None |
| Comp. Ex. 10 | 0.13 | 3 | 30 | — | — | Obserbed |
| Comp. Ex. 11 | 0.45 | 9 | 100 | 15 | 0.60 | None |

As indicated in Table 1, when the carbon black content was fixed, a high S/N was achieved in all cases (Embodiments 1 to 3, 15 to 17) where the mean particle diameter of the carbon black was within the range of 10 to 30 nm. By contrast, adequate S/N was not obtained in any case where the average particle size of the carbon black was lower than 10 nm (Comparative Examples 2, 8) or exceeded 30 Nm (Comparative Examples 3, 9). When the mean particle diameter of the carbon black was fixed, a high S/N was obtained in all cases (Embodiments 4 to 7, 18 to 21) where the carbon black content ranged from 10 to 50 mass parts. By contrast, adequate S/N was not obtained in any case where the carbon black content was lower than 10 parts (Comparative Examples 4, 10) or exceeded 50 parts (Comparative Examples 5, 11).

MR head electrostatic damage occurred when the carbon black content was less than 10 parts (Comparative Examples 4, 10). It was thus found that when a prescribed mass of carbon black was incorporated, the surface electrical resistivity of the magnetic layer was reduced.

Further, a higher S/N was obtained in cases where calendering was conducted following coating the lower layer (Embodiments 14 and 22) than those without calendering. A higher S/N could be achieved under calendering conditions of higher linear pressure and higher temperature (Embodiments 9 to 11). With regard to the Ra and Rz values, as the smaller the value, the higher the S/N obtained. Thus, it was found that as the smoother the surface of the magnetic layer of the magnetic recording medium, the higher the S/N obtained.

With regard to the coating method, the W/D method yielded a higher S/N than the W/W method (Embodiments 1 to 22, Comparative Example 1 and 7). Thus, it was found that wet-on-dry coating effectively reduced noise due to the thickness distribution of the magnetic layer. When wet-on-dry coating was conducted, the surface condition of the nonmagnetic layer significantly affected the level of disorder at the interface of the magnetic layer and the nonmagnetic layer. It was found that as the smoother the surface of the nonmagnetic layer, the higher the S/N obtained.

Further, when the thickness of the magnetic layer was 0.25 μm, electrostatic damage occurred (Comparative Example 6). Thus, electrostatic damage can be avoided by employing a magnetic layer thickness equal to or less than 0.2 μm.

As stated above, the magnetic recording medium of the present invention can reduce noise due to surface roughness of the magnetic layer, yielding good electromagnetic characteristics and a particularly high S/N.

Further, since the magnetic recording medium of the present invention permits a reduction in the spacing between the MR head and the medium, a magnetic recording medium suitable for the magnetic recording medium with an MR head can be provided without electrostatic damage.

The present disclosure relates to the subject matter contained in Japanese Patent Application No. 2001-205290 filed on Jul. 5, 2001, which is expressly incorporated herein by reference in its entirety.

What is claimed is:

1. A magnetic recording medium comprising a nonmagnetic layer comprising a nonmagnetic powder and a binder and a magnetic layer comprising a ferromagnetic metal powder or a ferromagnetic hexagonal ferrite powder and a binder in this order on at least one side of a nonmagnetic support, wherein said nonmagnetic layer comprises 10 to 50 mass parts of carbon black with a mean particle diameter of 10 to 30 nm per 100 mass parts of said nonmagnetic powder, said magnetic layer has a thickness equal to or less than 0.2 μm, the standard deviation b of the average intensity a of elements due to said ferromagnetic powder as determined by electron-beam microanalysis is $0.03 \leq b/a \leq 0.4$, and said magnetic layer has a center surface average roughness Ra equal to or less than 5 nm and a ten-point average roughness Rz equal to or less than 50 nm.

2. The magnetic recording medium according to claim 1, wherein said carbon black has a mean particle diameter of 15 to 25 nm.

3. The magnetic recording medium according to claim 1, wherein said carbon black has a mean particle diameter of 18 to 22 nm.

4. The magnetic recording medium according to claim 1, wherein said nonmagnetic layer comprises 20 to 40 mass parts of the carbon black per 100 mass parts of the nonmagnetic powder.

5. The magnetic recording medium according to claim 1, wherein said nonmagnetic layer comprises 20 to 30 mass parts of the carbon black per 100 mass parts of the nonmagnetic powder.

6. The magnetic recording medium according to claim 1, wherein said carbon black has a specific surface area ranging from 100 to 500 m²/g.

7. The magnetic recording medium according to claim 1, wherein said carbon black has a specific surface area ranging from 150 to 400 m²/g.

8. The magnetic recording medium according to claim 1, wherein said carbon black has a DBP oil absorption capacity ranging from 20 to 400 ml/100 g.

9. The magnetic recording medium according to claim 1, wherein said carbon black has a DBP oil absorption capacity ranging from 30 to 400 ml/100 g.

10. The magnetic recording medium according to claim 1, wherein said carbon black has a pH ranging from 2 to 10.

11. The magnetic recording medium according to claim 1, wherein said carbon black has a moisture content ranging from 0.1 to 10 percent.

12. The magnetic recording medium according to claim 1, wherein said magnetic layer has a thickness ranging from 0.01 to 0.15 μm.

13. The magnetic recording medium according to claim 1, wherein said magnetic layer has a thickness ranging from 0.01 to 0.1 μm.

14. The magnetic recording medium according to claim 1, wherein said value b/a is controlled to within $0.03 \leq b/a \leq 0.3$.

15. The magnetic recording medium according to claim 1, wherein said value b/a is controlled to within $0.03 \leq b/a \leq 0.2$.

16. The magnetic recording medium according to claim 1, wherein said magnetic layer has a center surface average roughness Ra ranging from 0.5 to 4 nm.

17. The magnetic recording medium according to claim 1, wherein said magnetic layer has a center surface average roughness Ra ranging from 0.5 to 3 nm.

18. The magnetic recording medium according to claim 1, wherein said magnetic layer has a ten-point average roughness Rz ranging from 5 to 40 nm.

19. The magnetic recording medium according to claim 1, wherein said magnetic layer has a ten-point average roughness Rz ranging from 5 to 30 nm.

20. A method for use of the magnetic recording medium according to claim 1, wherein a MR head is employed during recording and reproduction.

* * * * *